(12) United States Patent
Schulz et al.

(10) Patent No.: US 9,266,050 B2
(45) Date of Patent: Feb. 23, 2016

(54) FILTER CARTRIDGE

(71) Applicant: Carl Freudenberg KG, Weinheim (DE)

(72) Inventors: Karsten Schulz, Neckarbischofsheim (DE); Maik Sieh, Sandhausen (DE); Juergen Klaus, Hemsbach (DE); Juergen Becker, Zeiskam (DE)

(73) Assignee: CARL FREUDENBERG KG, Weinheim (DE)

( * ) Notice: Subject to any disclaimer, the term of this patent is extended or adjusted under 35 U.S.C. 154(b) by 247 days.

(21) Appl. No.: 14/022,265

(22) Filed: Sep. 10, 2013

(65) Prior Publication Data
US 2014/0069068 A1 Mar. 13, 2014

(30) Foreign Application Priority Data
Sep. 11, 2012 (DE) .......................... 10 2012 017 890

(51) Int. Cl.
B01D 46/52 (2006.01)
B01D 46/24 (2006.01)

(52) U.S. Cl.
CPC .......... *B01D 46/521* (2013.01); *B01D 46/2411* (2013.01); *B01D 2275/205* (2013.01)

(58) Field of Classification Search
CPC ...................................................... B01D 46/00
See application file for complete search history.

(56) References Cited

U.S. PATENT DOCUMENTS

| 2,732,951 | A | 1/1956 | Magondeaux | |
| 5,536,290 | A * | 7/1996 | Stark et al. | 55/498 |
| 7,993,427 | B2 * | 8/2011 | Hassmann et al. | 55/486 |
| 2002/0121474 | A1 * | 9/2002 | Cullen | 210/493.1 |
| 2004/0060858 | A1 | 4/2004 | Lucas et al. | |

FOREIGN PATENT DOCUMENTS

| CN | 1684752 A | 10/2005 |
| DE | 102006003949 B4 | 4/2008 |
| GB | 2327624 A | 2/1999 |

* cited by examiner

*Primary Examiner* — Duane Smith
*Assistant Examiner* — Adam W Bergfelder
(74) *Attorney, Agent, or Firm* — Leydig, Voit & Mayer, Ltd.

(57) ABSTRACT

A filter cartridge includes a filter medium configured as an elongated bellows having a first and a second longitudinal end. The bellows are connected at the first longitudinal end to a base and at the second longitudinal end to a top. The bellows enclose a central passage. The bellows are configured in a shape of a prism.

18 Claims, 3 Drawing Sheets

FILTER CARTRIDGE

CROSS-REFERENCE TO PRIOR APPLICATION

Priority is claimed to German Patent Application No. DE 10 2012 017 890.5, filed on Sep. 11, 2012, the entire disclosure of which is hereby incorporated by reference herein.

FIELD

The invention relates to a filter cartridge comprising a filter medium configured as an elongated bellows.

BACKGROUND

One such filter cartridge is known from DE 10 2006 003 949 B4. Such filter cartridges are often used in dust removal systems and industrial air conditioning systems.

At present, air loaded with wet paint particles in painting installations is sucked through a dust chamber, in which there is a bed made of limestone powder. The limestone powder is intended to bind the wet paint particles. Filter plates follow this dust chamber and this bed. Following the passage through the filter plates, the air is intended to be as pure as possible.

Instead of filter plates, filter cartridges could also be used, since these exhibit a higher filter area. However, the filter cartridges would have to generate beneficial flow conditions in the dust chamber in order that as many paint particles as possible are bound by the limestone powder there.

SUMMARY

In an embodiment, the present invention provides a filter cartridge having a filter medium configured as an elongated bellows having a first and a second longitudinal end. The bellows are connected at the first longitudinal end to a base and at the second longitudinal end to a top. The bellows enclose a central passage. The bellows are configured in a shape of a prism.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
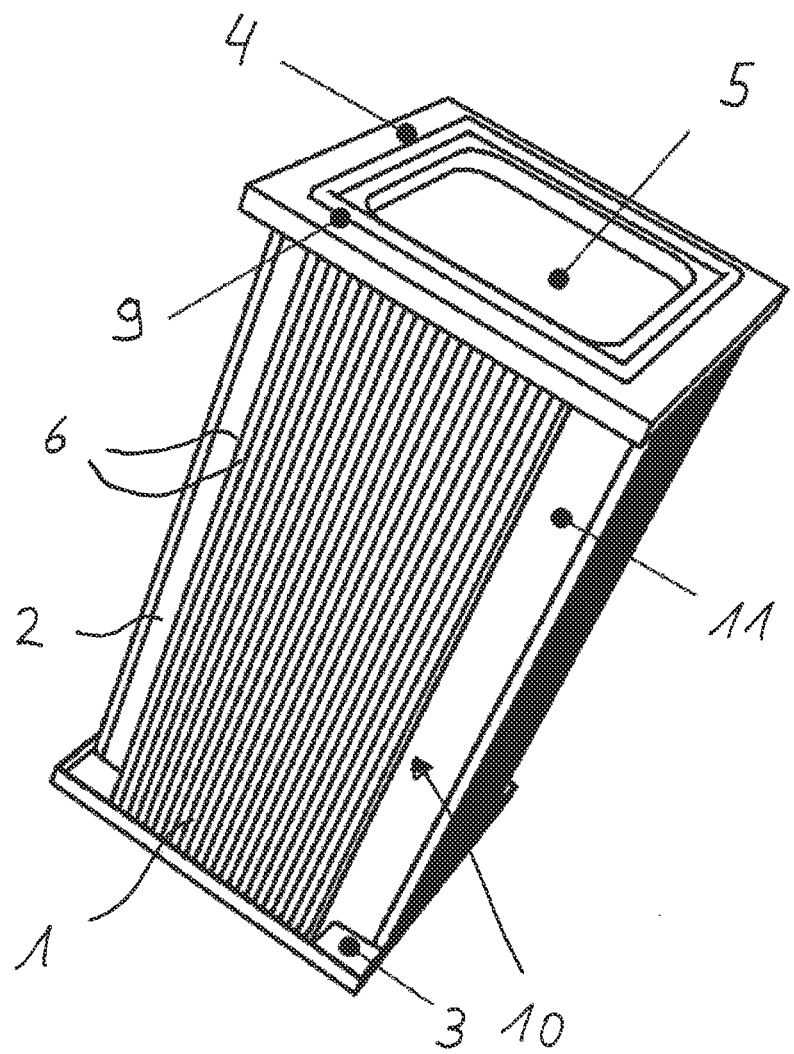
FIG. 1 shows a perspective view of a rectangular block-shaped filter cartridge according to an embodiment of the present invention.

In an embodiment, the present invention provides a filter cartridge which influences the flow conditions in a gas chamber in such a way that as many dirt particles as possible are bound.

Prior to the invention, the expectation existed in the art that a filter cartridge of rectangular cross section would be rather disadvantageous in dust removal systems and for dust removal applications.

Surprisingly, however, the inventors have found that a substantially prism-like filter cartridge leads to a reduction in pressure difference and that a type of vortex layer is formed in a dust chamber adjacent to the filter cartridge or a plurality of filter cartridges.

This leads to a considerable improvement in the flow conditions. The vortex layer increases the residence time of the dust and limestone powder in a certain region, so that the contact time with dirt particles to be bound is increased.

Furthermore, the pure air quality is increased since, as compared with a round filter cartridge, a higher filter area and a lower flow velocity per unit filter area occur.

According to an embodiment of the invention, it has also been recognized that, in the case of a substantially prism-like filter cartridge, as compared with a round filter cartridge, a greater air outlet area is available at the top. This results in a lower pressure difference with the same volume flow.

To this extent, a filter cartridge is specified which influences the flow conditions in a dust chamber in such a way that as many dirt particles as possible are bound.

As used herein, a prism is a geometric body which has a polygon as base area and the side edges of which are substantially parallel and equally long.

The backs of the folds of the bellows could extend parallel to its longitudinal axis. In this way, the filter cartridge exhibits high stability against end compression in the longitudinal direction.

The bellows could be configured in the form of a rectangular block. In the case of a substantially rectangular block-shaped bellows, as compared with a round filter cartridge, an air outlet surface that is greater by 18% is available at the top.

The top and the base could be configured as rectangles or squares. In this way, the filter cartridge could be flange-mounted without difficulty on existing filter housings of painting machines.

A specific design of the filter cartridge makes it possible to mount one or more filter cartridges simply and reliably on the untreated gas side with the aid of quick-action closures. Fixing can be carried out via a bayonet closure or click-action closure. Also possible is multiple mounting of up to four filter cartridges in series by means of a mounting linkage.

The ratio of height to width of the filter cartridge or of the bellows could be 1 to 1 to 5 to 1. Filter cartridges having this length-width ratio can advantageously replace horizontally arranged filter plates or tubular elements arranged vertically or in a suspended manner.

The depth of the folds of the bellows could be 15 to 50 mm. In this way, a uniform and homogeneous distribution of the flow velocities is realized.

The bellows could be configured to be circumferentially endless. In this way, cut edges and adhesive bonding points are minimized.

Horizontally arranged supporting bands could preferably be assigned to the bellows. In this way, the spacing of the folds is maintained permanently.

The bellows could be potted in polyurethane at the top and/or base. In this way, leaks at the base and/or top are avoided.

The bellows could surround a supporting basket. In this way, collapse of the bellows is prevented.

The supporting basket could be potted in polyurethane at the top and/or base. In this way, the supporting basket is fixed permanently.

A preferably silicone-free seal could be applied to the top and/or to the base. In this way, tight contact of the top and/or base on a flange can be ensured.

The filter medium could be formed in many layers, could have a nanofiber layer and be configured to be antistatic. In this way, very fine dirt particles can be filtered. As a result of the electrically antistatic finishing, the adherence of fine dirt particles is reduced.

In corner regions of the bellows, a band, preferably made of non-woven, or a bezel, preferably made of plastic, could be applied to the bellows. In this way, each of two folded-open fold walls are stabilized in the corner regions. Both the band and the bezel can be potted in polyurethane.

An arrangement could comprise a filter housing with a dust chamber and at least one filter cartridge of the type described here, the filter cartridge projecting into the dust chamber.

The filter cartridge described here is suitable for use in a process in which, in wet painting processes, a conventional wet washing system which uses water is replaced by a dry system operating with filter elements.

In order to prevent the filter elements being stuck together with paint, an inert filter aid, specifically limestone powder, is used in excess, binding wet paint particles from an overspray in the air stream or on a filter surface. In the known systems, filter plates and tubular filter elements are used, which are installed horizontally in the filter housing.

By means of the filter cartridge described here, a better flow situation is created in the dust chamber. So to speak, the formation of a vortex layer takes place. This depends on the geometry of the filter cartridge and its arrangement on the dusty air side in the filter housing. The residence time of the limestone powder for binding paint is increased.

By using the filter cartridge described here, a uniform and homogeneous distribution of the flow velocities can be realized through the formation of equidistant filter cartridge spacings.

By means of suitable design of the spacings, the region between the filter cartridges can be operated as a quasi-stationary vortex layer. At the same time, in the comparable overall space which is determined by the diameter of a round filter cartridge, more filter medium can be accommodated with the same fold spacing.

Furthermore, there is the possibility of implementing the formation of the top of the filter cartridge in a novel form or type of fixing.

Figure 2:
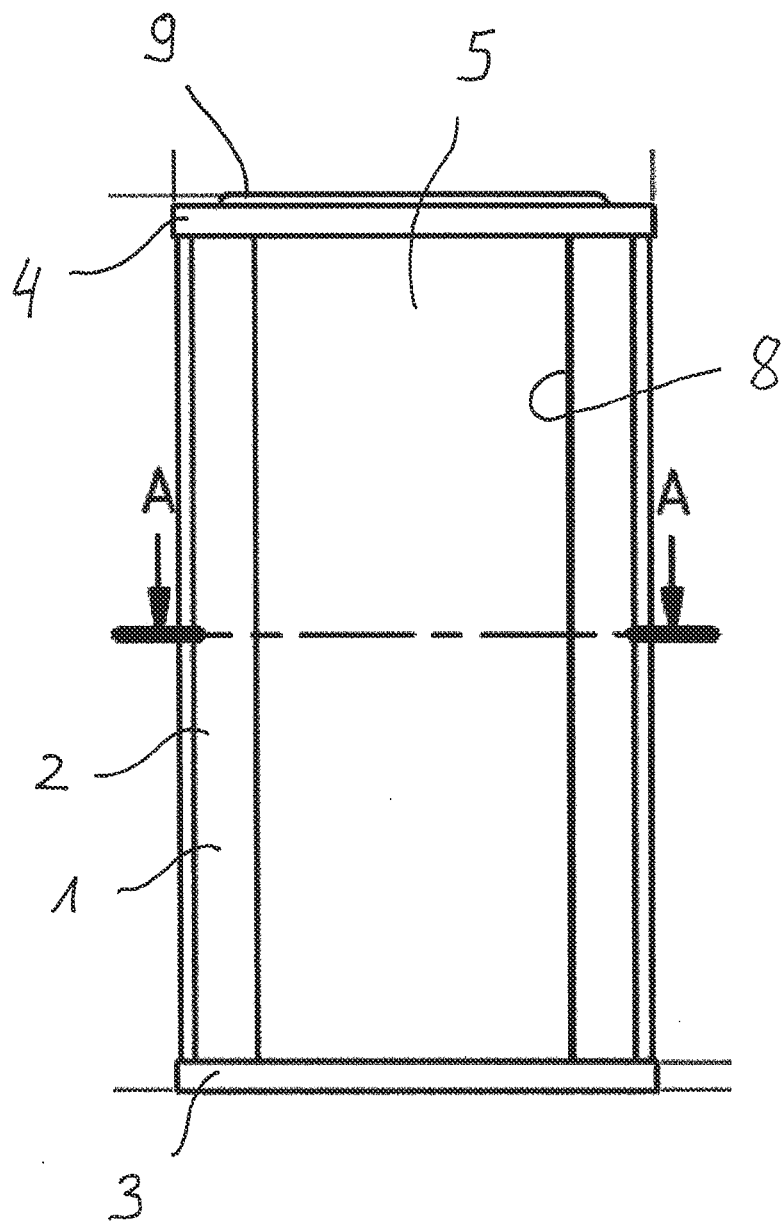
FIG. 2 shows a longitudinal sectional view of the filter cartridge according to FIG. 1.

A filter cartridge is shown perspectively in FIG. 1 and in a longitudinal sectional view in FIG. 2, comprising a filter medium 1 which is configured as an elongated bellows 2, the bellows 2 being connected at its first longitudinal end to a base 3 and at its second longitudinal end to a top 4, and the bellows 2 enclosing a central passage 5.

The bellows 2 is configured in the shape of a prism.

FIG. 1 shows that the backs 6 of the folds of the bellows 2 extend parallel to its longitudinal axis. The bellows 2 is configured in the form of a rectangular block. The backs 6 of the folds of the bellows 2 each lie on four side surfaces, which form the rectangular block.

Figure 3:
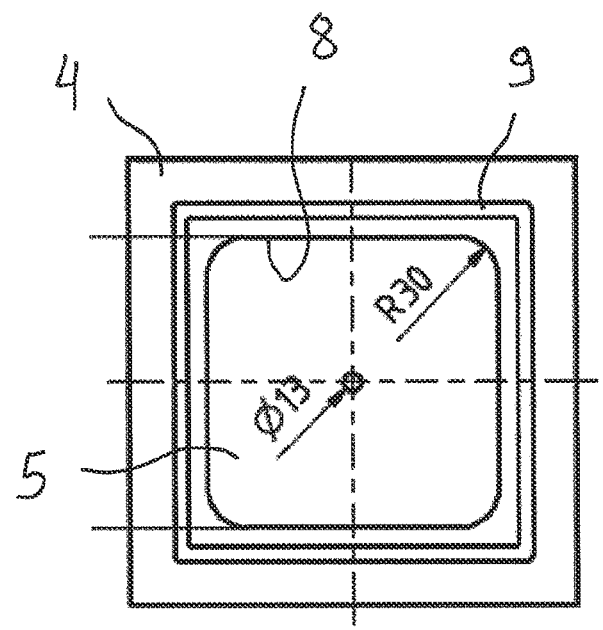
FIG. 3 shows a plan view of the top of the filter cartridge according to FIG. 1.

FIG. 3 shows that the top 4 is configured to be square. FIG. 1 shows that the top 4 and the base 3 are configured as squares. The ratio of height to width of the filter cartridge or of the bellows 2 is 1 to 1 to 5 to 1.

Figure 4:
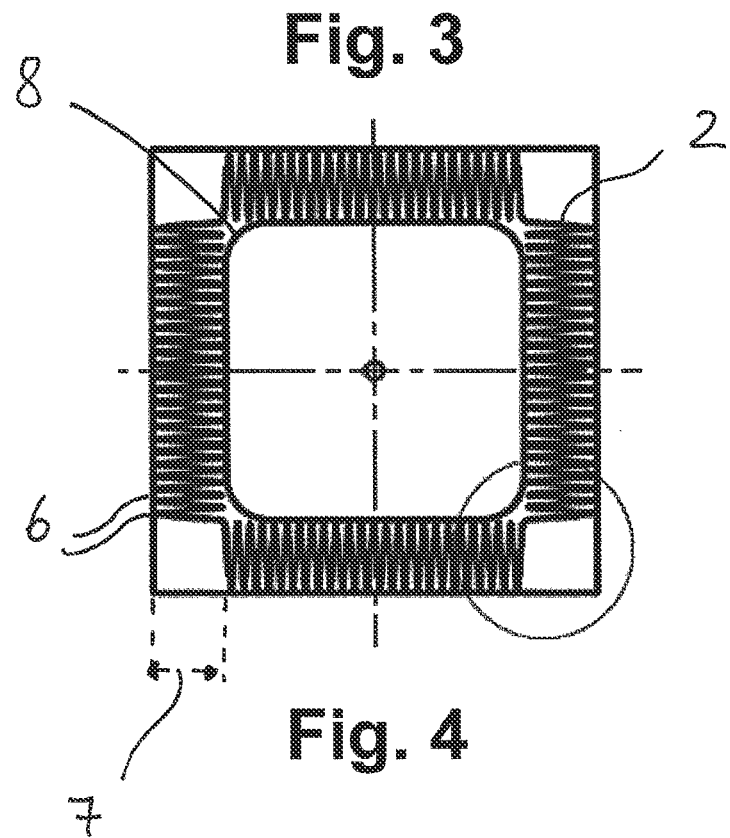
FIG. 4 shows a cross-sectional view of the filter cartridge according to FIG. 1.

FIG. 4 shows that the depth 7 of the folds of the bellows 2 is 15 to 50 mm. The bellows 2 is configured to be circumferentially endless. The bellows 2 is potted in polyurethane at the top 4 and at the base 3. The bellows 2 surrounds a supporting basket 8. The supporting basket 8 is potted in polyurethane at the top 4 and at the base 3.

FIG. 3 shows that a seal 9 is applied to the top 4. The seal 9 is configured circumferentially. The seal 9 is silicone-free.

The filter medium 1 is formed in many layers, has a nanofiber layer and is finished anti-statically. The filter medium 1 can be cleaned off with compressed air.

FIG. 1 shows that a band 11 or a bezel is applied to the bellows 2 in corner regions 10 of the bellows 2. In this way, an edge protector is created. The fold walls located in the corner region 10, folded open approximately through 90°, are stabilized by the band 11. The band 11 is likewise potted in polyurethane at the base 3 and the top 4.

The filter cartridge has a length of 100 to 500 mm and a width of 100 to 500 mm. The height of the filter cartridge is at most 2500 mm.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A filter cartridge, comprising:
a filter medium configured as an elongated bellows including a first and a second longitudinal end; and
a band or a bezel that is applied to the bellows in corner regions of the bellows,
wherein the bellows is connected at the first longitudinal end to a base and at the second longitudinal end to a top,
wherein the bellows encloses a central passage, and
wherein the bellows is configured in a shape of a prism.

2. The filter cartridge according to claim 1, wherein backs of folds of the bellows extend parallel to a longitudinal axis of the bellows.

3. The filter cartridge according to claim 1, wherein the bellows is configured in a form of a rectangular block.

4. The filter cartridge according to claim 1, wherein the top and the base are configured as rectangles.

5. The filter cartridge according to claim 1, wherein a ratio of height to width of the filter cartridge or of the bellows is from 1:1 to 5:1.

6. The filter cartridge according to claim 1, wherein a depth of folds of the bellows is from 15 to 50 mm.

7. The filter cartridge according to claim 1, wherein the bellows is configured to be circumferentially endless.

8. The filter cartridge according to claim 1, further comprising supporting bands assigned to the bellows.

9. The filter cartridge according to claim 1, wherein the bellows is potted in polyurethane at at least one of the top and the base.

10. The filter cartridge according to claim 1, further comprising a supporting basket, the bellows surrounding the supporting basket.

11. The filter cartridge according to claim 10, wherein the supporting basket is potted in polyurethane at at least one of the top and the base.

12. The filter cartridge according to claim 1, further comprising a seal that is applied to at least one of the top and the base.

13. The filter cartridge according to claim 1, wherein the filter medium is formed in a plurality of layers, including a nanofiber layer, and is configured to be anti-static.

14. The filter cartridge according to claim 1, comprising the band.

15. The filter cartridge according to claim 1, comprising the bezel.

16. The filter cartridge according to claim 1, wherein the bezel is present and made of a material including a plastic.

17. An arrangement, comprising:
a filter housing including a dust chamber; and
a filter cartridge,
wherein the filter cartridge projects into the dust chamber,
wherein the filter cartridge includes a filter medium configured as an elongated bellows including a first and a second longitudinal end,
wherein the filter cartridge further includes a band or a bezel that is applied to the bellows in corner regions of the bellows,
wherein the bellows is connected at the first longitudinal end to a base and at the second longitudinal end to a top,
wherein the bellows encloses a central passage, and
wherein the bellows is configured in a shape of a prism.

18. A method of performing a wet painting process, comprising:
replacing a wet washing system, which uses water, with a dry system including the filter of claim 1.

* * * * *